United States Patent
Hirata et al.

(10) Patent No.: US 7,537,272 B2
(45) Date of Patent: May 26, 2009

(54) SAFETY DEVICE OF VEHICLE

(75) Inventors: Yorimitsu Hirata, Hiroshima (JP); Kenji Fujita, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 406 days.

(21) Appl. No.: 11/448,846

(22) Filed: Jun. 8, 2006

(65) Prior Publication Data
US 2006/0290172 A1 Dec. 28, 2006

(30) Foreign Application Priority Data
Jun. 23, 2005 (JP) ............... 2005-182894
Jun. 23, 2005 (JP) ............... 2005-182895
Jun. 23, 2005 (JP) ............... 2005-182896

(51) Int. Cl.
*B60R 21/34* (2006.01)
(52) U.S. Cl. ................................. 296/187.04
(58) Field of Classification Search ............ 296/187.03, 296/187.04, 187.09, 193.11, 1.04
See application file for complete search history.

(56) References Cited

U.S. PATENT DOCUMENTS

| | | | |
|---|---|---|---|
| 6,257,657 B1 * | 7/2001 | Sasaki | 296/187.09 |
| 7,077,225 B2 * | 7/2006 | Minami | 180/69.21 |
| 7,232,178 B2 * | 6/2007 | Neal et al. | 296/187.04 |
| 2004/0113459 A1 * | 6/2004 | Mattsson et al. | 296/187.04 |
| 2005/0082873 A1 * | 4/2005 | Takehara | 296/187.09 |
| 2005/0179286 A1 * | 8/2005 | Adachi | 296/193.11 |
| 2005/0206199 A1 * | 9/2005 | Minami | 296/193.11 |
| 2006/0060408 A1 * | 3/2006 | Kalliske et al. | 180/274 |
| 2006/0108169 A1 * | 5/2006 | Borg et al. | 180/274 |
| 2006/0202512 A1 * | 9/2006 | Brei et al. | 296/187.04 |
| 2006/0213709 A1 * | 9/2006 | Yamaguchi et al. | 180/69.21 |
| 2007/0187993 A1 * | 8/2007 | Kalargeros | 296/193.11 |
| 2007/0267892 A1 * | 11/2007 | Scheuch et al. | 296/187.04 |

FOREIGN PATENT DOCUMENTS

| | | |
|---|---|---|
| DE | 10259114 | 7/2004 |
| EP | 0967128 | 12/1999 |
| JP | 11-348716 | 12/1999 |
| JP | 11348716 | 3/2000 |
| JP | 2005-059799 | 3/2005 |

OTHER PUBLICATIONS

European Search Report dated Sep. 1, 2006 Application No. EP 06 01 0428.

* cited by examiner

*Primary Examiner*—H Gutman
(74) *Attorney, Agent, or Firm*—Studebaker & Brackett PC; Donald R. Studebaker

(57) ABSTRACT

In a safety device of a vehicle, which includes fenders located at both sides of the vehicle to form a front side of the vehicle and a hood covering an upper space between the fenders to form a front portion of the vehicle, there are provided a cowl portion formed in a gutter shape having an opening upward, an actuator operative to lift up a rear portion of the hood relative to the vehicle body, and a bracket to attach the actuator to the vehicle body. Herein, the bracket is placed on the vehicle body from above so as to be laid across the opening of the cowl portion. Accordingly, this safety device can improve the efficiency of operations of attaching the actuator to the vehicle body.

19 Claims, 11 Drawing Sheets

SAFETY DEVICE OF VEHICLE

BACKGROUND OF THE INVENTION

The present invention relates to a safety device of a vehicle in which a rear portion of a hood can be lifted up by a lifting device.

When a vehicle hits against a pedestrian, there would be a concern that the pedestrian is pushed up on the hood of the vehicle and then hits indirectly via the hood against a hard member such as an engine that is provided below the hood. Conventionally, in order to avoid this situation a device by which the rear portion of the hood is configured to be lifted up relative to a vehicle body is known. For example, Japanese Patent Laid-Open Publication No. 11-348716 discloses a specific structure of such a device, in which there is provided an actuator for lifting (lifting device) that is attached with bolts via an attaching member (reinforcement member) to a front wall of a cowl portion formed in a gutter shape having an opening upward that is disposed below the rear portion of the hood.

Herein, the above-described structure would have a certain problem. Namely, the engine or other components are generally installed in the engine room before attaching some actuators or the like. Accordingly, when the above-described attaching member and actuators are attached by fastening bolts from the engine-room side, operation tools or worker's hand would interfere with these components disposed in the engine room, so such operations could not be conducted efficiently. In some case, it may be necessary for the installed engine or components disposed in the engine room to be removed in order to detach such actuators or the like for their replacements or adjustments. Also, since parts such as a wiper linkage are disposed within the cowl portion, interference with these parts would also need to be paid attention to.

Further, there generally exists a gap between an side edge of the hood and an upper edge of the fender of the vehicle. Accordingly, it may be possible that someone inserts tools or something through this gap and the actuator is removed or tampered with using these. Thus, there is a problem that the actuator would be stolen or tampered as well. Since the above-described actuator is generally operated with a gas generator in which explosives are ignited to produce gas as shown in Japanese Patent Laid-Open Publication No. 2005-059779, the stealing and tapering of the actuator may need to be prevented surely.

SUMMARY OF THE INVENTION

The present invention has been devised in view of the above-described problems, and an object of the present invention is to provide a safety device of a vehicle that can improve the efficiency of operations of attaching the lifting device (actuator) to the vehicle body. Further, the present invention also aims at providing the safety device of a vehicle that can prevent the lifting device from being stolen or tampered.

According to the present invention, there is provided a safety device of a vehicle, which includes fenders located at both sides of the vehicle to form a front side of the vehicle and a bonnet covering an upper space between the fenders to form a front portion of the vehicle, comprising a cowl portion provided at a vehicle body, the cowl portion being formed in a gutter shape having an opening upward, a lifting device provided below the bonnet and operative to lift up a rear portion of the bonnet relative to the vehicle body, and an attaching member to attach the lifting device to the vehicle body thereby, the attaching member being placed on the vehicle body from above so as to be laid across the opening of the cowl portion.

According to the present invention, since the cowl portion formed in the gutter shape having the opening upward is provided at the vehicle body and the attaching member is placed on the vehicle body from above so as to be laid across the opening of the cowl portion, the attachment/detachment operations of the attaching member can be conducted from above. Thus, no only operations from inside the engine room may not be necessary but also the attachment/detachment of the attaching member can be conducted efficiently and properly in the case where parts such as the wiper linkage are disposed below the attaching member.

According to an embodiment of the present invention, the attaching member comprises a reinforcement provided to be laid across the opening of the cowl portion and a bracket attached to the reinforcement, and one end of the reinforcement is placed on a suspension tower of a suspension. Thereby, since the attaching member is comprised of at least two overlapped members of the reinforcement and the bracket, the rigidity of the attaching member is increased and improper downward bending of the attaching member that may receive a reaction force at the operation of the lifting device can be suppressed.

Also, since one end of the reinforcement is placed on the upper portion of the suspension tower accommodating the suspension, the reaction force from the lifting device can be transmitted to not only the cowl portion but to the suspension tower with a high rigidity. Then, it can be transmitted to a vehicle tire and a road surface via the suspension tower. Further, since the rigidity of the suspension tower comes to be increased further, an input load from the suspension can be supported properly and thereby the traveling stability of the vehicle can be improved.

According to another embodiment of the present invention, one end of the bracket is placed on the suspension tower in such a manner that the one end of the bracket and the one end of the reinforcement overlap each other. Thereby, likewise the reaction force from the lifting device can be transmitted to not only the cowl portion but to the suspension tower, and it can be transmitted to the vehicle tire and the road surface via the suspension tower. Further, since the rigidity of the suspension tower is increased further, the input load from the suspension can be supported properly and thereby the traveling stability of the vehicle can be improved.

According to another embodiment of the present invention, the bonnet is supported by a hinge device such that a front portion thereof can be opened and a rear portion thereof can be lifted up relative to the vehicle body, the hinge device being disposed outside the lifting device, and there is provided a cowl plate upper to reinforce an attaching portion of the hinge device to the vehicle body, the cowl plate upper extending downward below the attaching member. Thereby, the cowl plate upper is biased downward via the attaching member when the lifting device is operated. Accordingly, the hinge mechanism can be properly prevented from being deformed and lifted up by the bonnet whose rear portion is being lifted up, so the rear portion of the bonnet can be lifted up surely.

According to another embodiment of the present invention, an outside end portion of the bracket is placed on and fixed to the cowl plate upper, and at an inside end portion of the bracket is provided a flange extending downward in such a manner that the flange closely covers an inside end portion of the reinforcement. Thereby, the rigidity of the bracket is strengthened. Also, even if an inside portion of the bracket is fallen downward and bent with a support point of the outside side end portion by the reaction force caused by the operation of the lifting device, this can be prevented from being bent further by contacting the inside side portion of the cowl plate upper.

According to another embodiment of the present invention, the attaching member comprises an attaching face portion to which the lifting device is attached, which is disposed to be near an inside upper portion of the fender, and an inner end attaching portion of attaching portions that attach the attaching member to the vehicle body with a bolt is disposed below the attaching face portion. Thereby, even if a tool is inserted into a gap between the fender and the bonnet in order to detach the attaching member with the lifting device thereon, the tool would not reach the inner end attaching portion. Thus, detaching of the attaching member and the lifting device is prevented, so the anti-theft and anti-tampering of the lifting device can be attained.

According to another embodiment of the present invention, the attaching face portion is provided substantially horizontally. Thereby, the attaching face portion becomes an obstacle against the tool coming in between the fender and the bonnet, so the tool can be prevented more properly from reaching the inner end attaching portion.

According to another embodiment of the present invention, the lifting device includes an attaching seat to attach the lifting device to the attaching face portion of the attaching member, and the lifting device is fixed to the attaching face portion with a nut fastened from below to a bolt that is inserted from above into bolt through holes formed at the attaching seat and the attaching face portion. Accordingly, any tool may not reach the nut located below the attaching face portion, so it becomes difficult to detach the lifting device itself from the attaching member.

According to another embodiment of the present invention, below the nut is provided a plate member so as to cover the nut. Thereby, an access to the nut from below is prevented by the plate member. Accordingly, the lifting device can be prevented from being stolen further effectively.

According to another embodiment of the present invention, a vertical distance between the attaching face portion and the bonnet is set to be shorter than a vertical distance between the attaching face portion and the inner end attaching portion. Thereby, the tool inserted into the gap between the fender and the bonnet may not reach the inner end attaching portion and a maximum operational stroke of the lifting device can be obtained.

According to another embodiment of the present invention, the inner end attaching portion is fixed to a bottom portion of the cowl portion. Thereby, even if the tool is inserted into the gap between the fender and the bonnet from the front or the rear of the attaching device in order to make an access to the lifting device, the tool inserting is blocked by the front and rear vertical walls of the cowl portion. Thus, the anti-theft and anti-tampering of the lifting device can be properly attained. Further, the rigidity of the cowl portion can be increased properly by the attaching member.

According to another embodiment of the present invention, the bonnet is supported by a hinge device so as to be opened, and at least part of the hinge device is located between the fender and the lifting device. Thereby, even if the tool or something is inserted into the gap between the fender and the bonnet in order to make an access to the lifting device, the access is prevented by the hinge device. Thus, the anti-theft and anti-tampering of the lifting device can be attained.

According to another embodiment of the present invention, the above-described part of the hinge device located between the fender and the lifting device comprises a plurality of members, and the plural members are located to be in an offset state vertically. Thereby, the hinge device covers the space between the fender and the lifting device at a vertically large area, so the anti-theft and anti-tampering of the lifting device can be attained.

According to another embodiment of the present invention, the plural members of the hinge device located between the fender and the lifting device are disposed such that parts thereof overlap each other when viewed laterally. Thereby, the hinge device can stand even stronger force applied thereto by the tool or something.

According to another embodiment of the present invention, the plural members of the hinge device located between the fender and the lifting device are disposed longitudinally along an upper end portion of the fender or a side end portion of the bonnet. Thereby, the hinge device covers the space between the fender and the lifting device at a longitudinally large area, so the access to the lifting device from the front or the rear is also prevented and the effect of the anti-theft and anti-tampering of the lifting device can be improved.

According to another embodiment of the present invention, at least one of plural attaching portions that attach the attaching member to the vehicle body is disposed inside the part of the hinge device located between the fender and the lifting device. Thereby, the hinge device makes it difficult to make an access to the above-described at least one of plural attaching portions with the hinge device, so the attaching member with the lifting device can be prevented from being detached as well.

According to another embodiment of the present invention, the attaching member comprises an attaching face portion to which the lifting device is attached, which is disposed to be near an inside upper portion of the fender, the lifting device includes an attaching seat to attach the lifting device to the attaching face portion of the attaching member, and the lifting device is fixed to the attaching face portion with a nut fastened from below to a bolt that is inserted from above into bolt through holes formed at the attaching seat and the attaching face portion. Thereby, the tool could not reach the nut located below the attaching face portion, so it becomes difficult to detach the lifting device itself from the attaching member.

Other features, aspects, and advantages of the present invention will become apparent from the following description which refers to the accompanying drawings.

DETAILED DESCRIPTION OF THE INVENTION

Hereinafter, a preferred embodiment of the present invention will be described.

Figure 1:
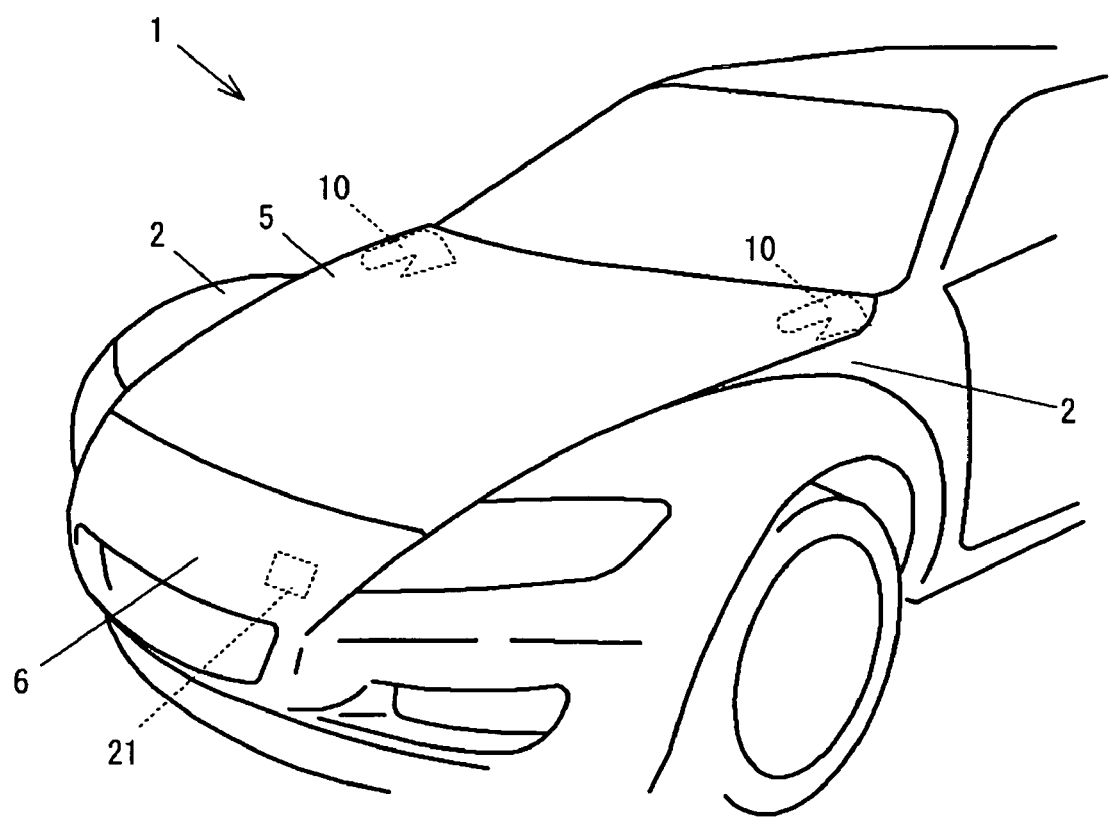
FIG. 1 is a perspective view of a front portion of a vehicle, to which a safety device according to an embodiment of the present invention is applied.
Figure 2:
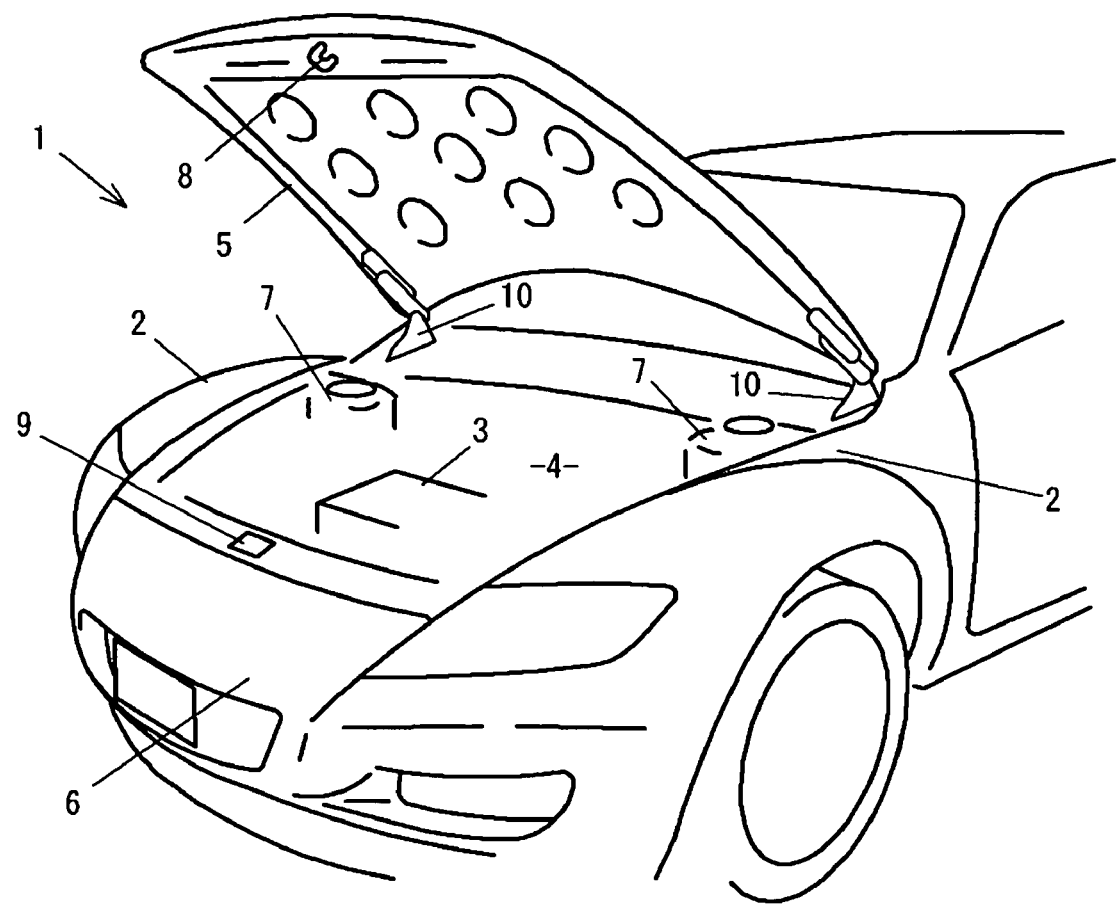
FIG. 2 is a perspective view of the front portion of the vehicle with a hood that is opened around its rear portion.
Figure 3:
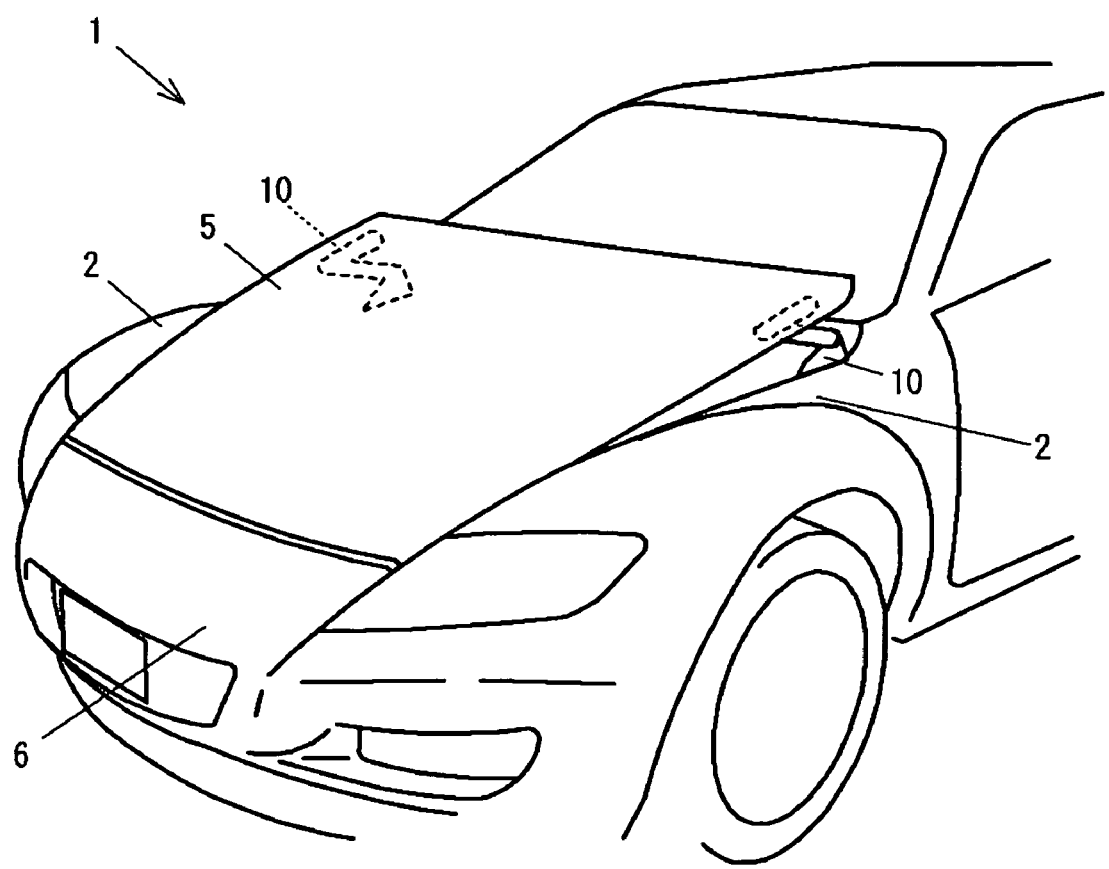
FIG. 3 is a perspective view of the front portion of the vehicle with the hood whose rear portion is lifted up relative to a vehicle body.
Figure 4:
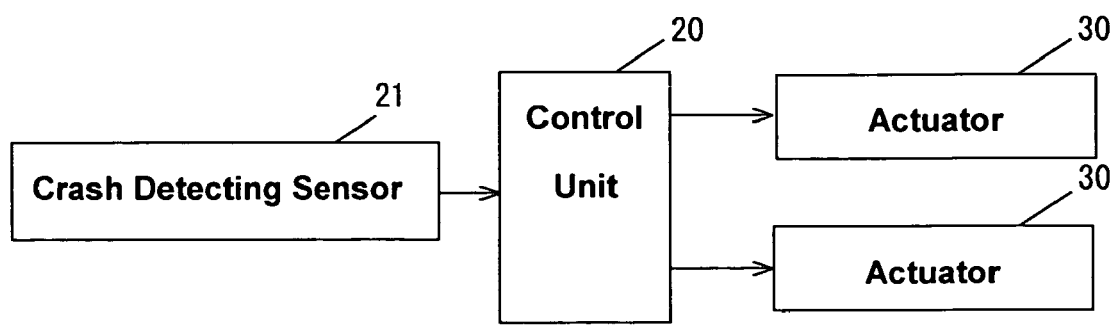
FIG. 4 is a control diagram of the safety device of the vehicle.

FIGS. 1 through 3 are perspective views showing a front portion of a vehicle 1 according to the present embodiment. As shown in these figures, an engine room 4 for an engine 3 is provided between fenders 2, 2 located at both sides of the vehicle, and the engine room 4 is covered with a hood in a normal use state as shown in FIG. 1. The hood 5 is supported by hinge mechanisms 10, 10 (these will be described in detail below referring to other figures) to be opened around its rear portion, as shown in FIG. 2. Thereby, maintenances and the like can be conducted easily in the engine room 4. Further, when a control unit 20 shown in FIG. 4 detects a vehicle crash based on a detecting signal of a crash sensor 21 that is provided at a front bumper 6, actuators 30, 30 are operated as shown in FIG. 3, so the rear portion of the hood 5 can be lifted up relative to the vehicle body. Thereby, for example, when the vehicle hits against a pedestrian, the pedestrian who has been pushed up on the hood 5 can be prevented from even indirectly hitting against a hard member such as the engine 3 that is provided below the hood 5.

Herein, a conventional sensor such as a pressure sensor, an accelerator sensor may be applied as the crash sensor 21. Also, the actuators 30, 30 may be operated when the crash is predicted instead of the crash being detected.

The actuator 30 comprises, as shown in FIGS. 5-8, a plurality of cylindrical members 31 . . . 31 that are provided coaxially and can slide vertically, and in these cylindrical members 31 . . . 31 explosives and an ignition circuit to ignite the explosives are provided. When an ignition signal is supplied to the ignition circuit from the control unit 20, the explosives are ignited to produce gas. The cylindrical members 31 . . . 31 are pushed upward by pressure of the produced gas (see FIG. 11). Herein, at respective end portions of the cylindrical members 31 . . . 31 are provided stoppers to prevent a gas leakage and the inner cylindrical members 31 . . . 31 from passing through them.

Figure 5:
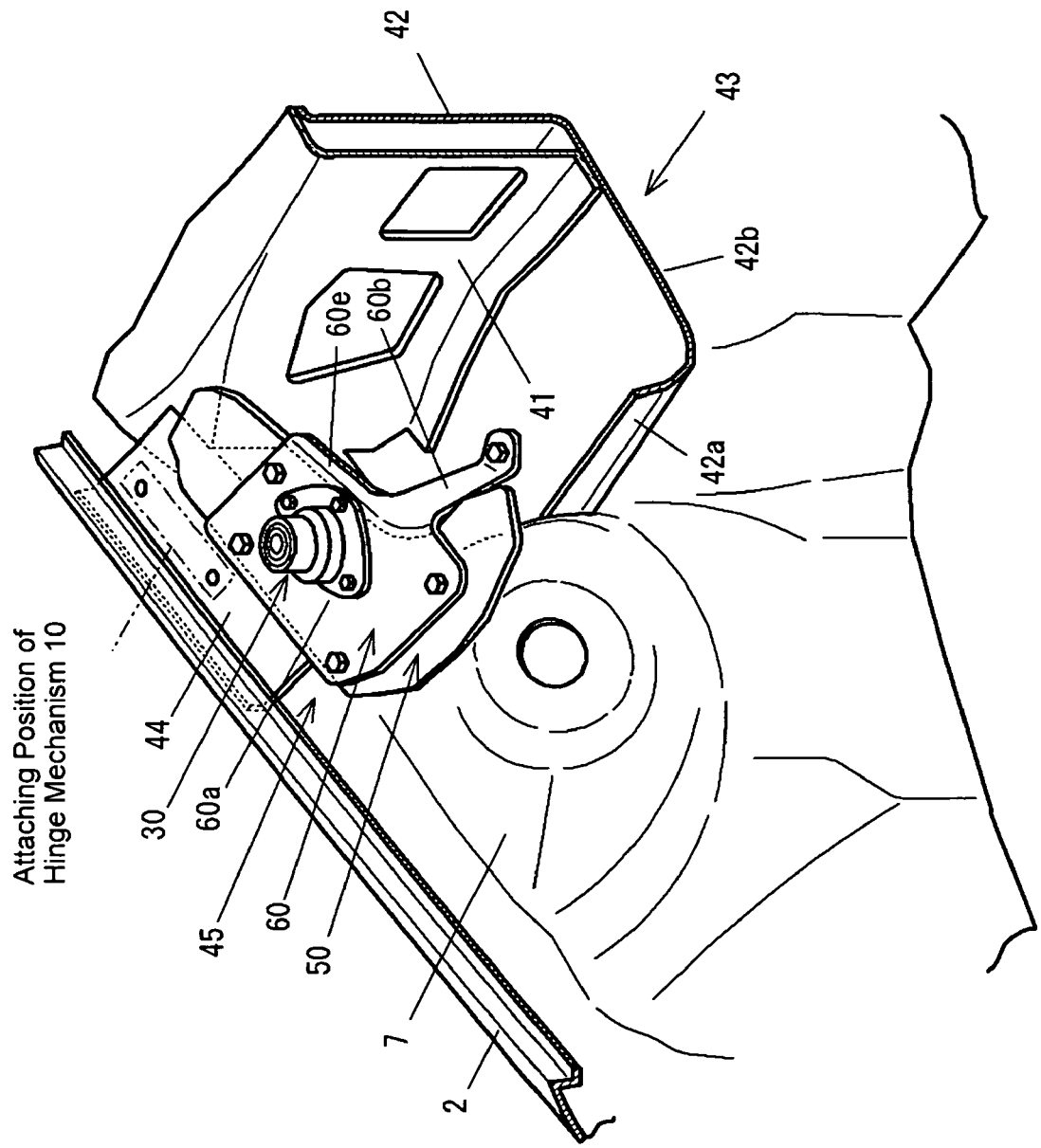
FIG. 5 is an enlarged perspective view of an actuator and its surrounding portion.

Next, a structure of a rear portion of the engine room 4 where the hinge mechanisms 10, 10 and the actuators 30, 30 are provided will be described. As shown in FIGS. 2 and 5, suspension towers 7, 7 to support a front suspension, not illustrated, are formed so as to project inward from the fenders 2, 2 (although only one side of the fender 2 is illustrated in FIG. 5, the other one is also provided symmetrically, and therefore the following descriptions will relate to only the one. A structure about the other one is the same as that about this except a part with particular explanations).

Figure 6:
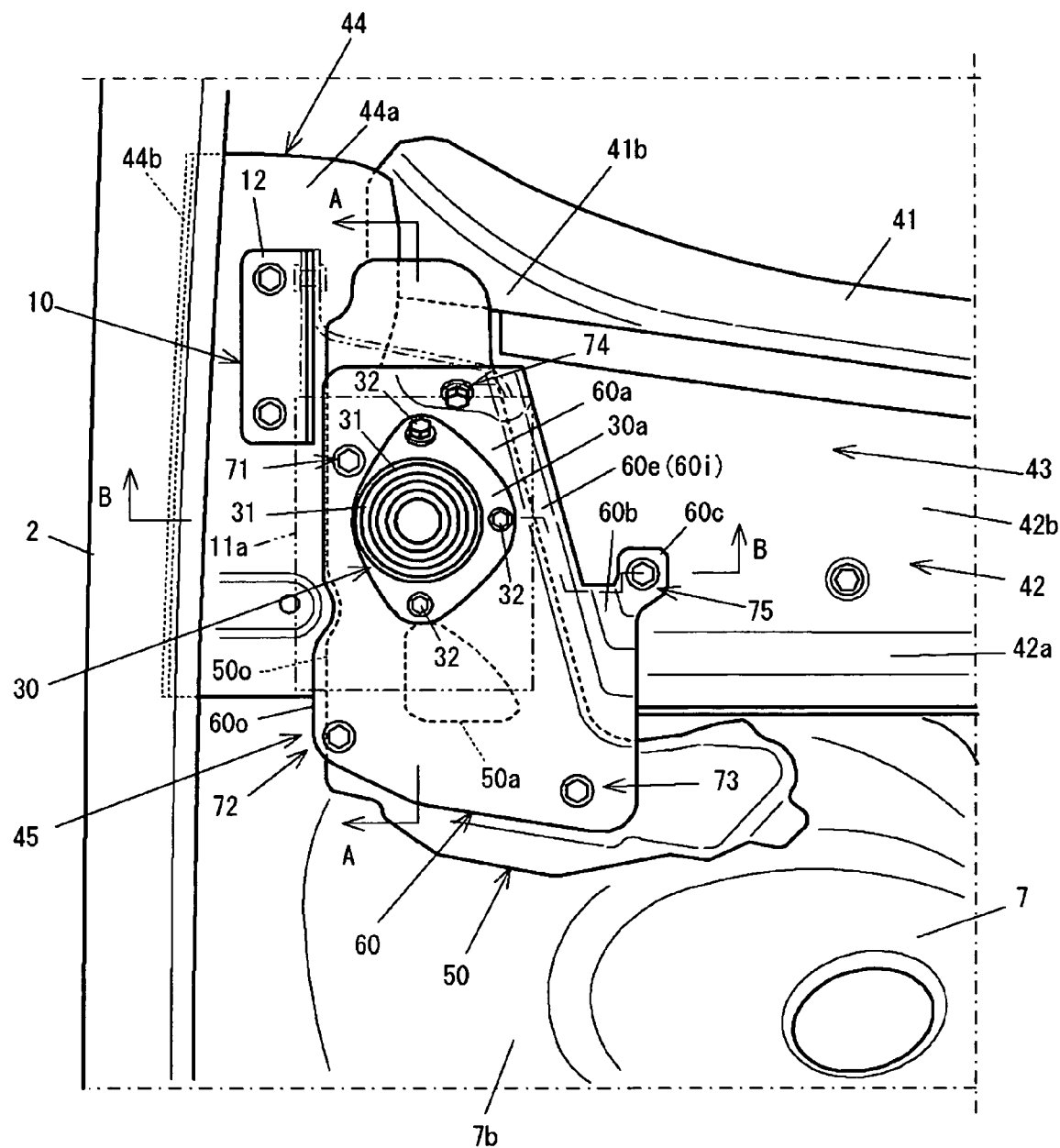
FIG. 6 is a plan view of the actuator and its surrounding portion.

As illustrated in FIGS. 5 and 6, a cowl front panel 41 and a cowl rear panel 42 are provided between the fenders 2, 2 so as to extend in a vehicle width direction.

The cowl rear panel 42 is formed in a gutter shape, in which an opening is provided upward, and its front wall 42a is fixed to a side wall 7a of the suspension tower 7. The cowl front panel 41 is placed on the cowl rear panel 42 from the above, and its upper portion is fixed to an upper portion of the cowl rear panel 42, and its lower portion is fixed to a bottom wall 42b of the cowl rear panel 42. The side wall 7a of the suspension tower 7, cowl front panel 41 and cowl rear panel 42 form a cowl portion 43 that is formed in a gutter shape having an opening upward, and there are provided wiper link mechanism and the like, which are not illustrated, within the cowl portion 43.

Figure 8:
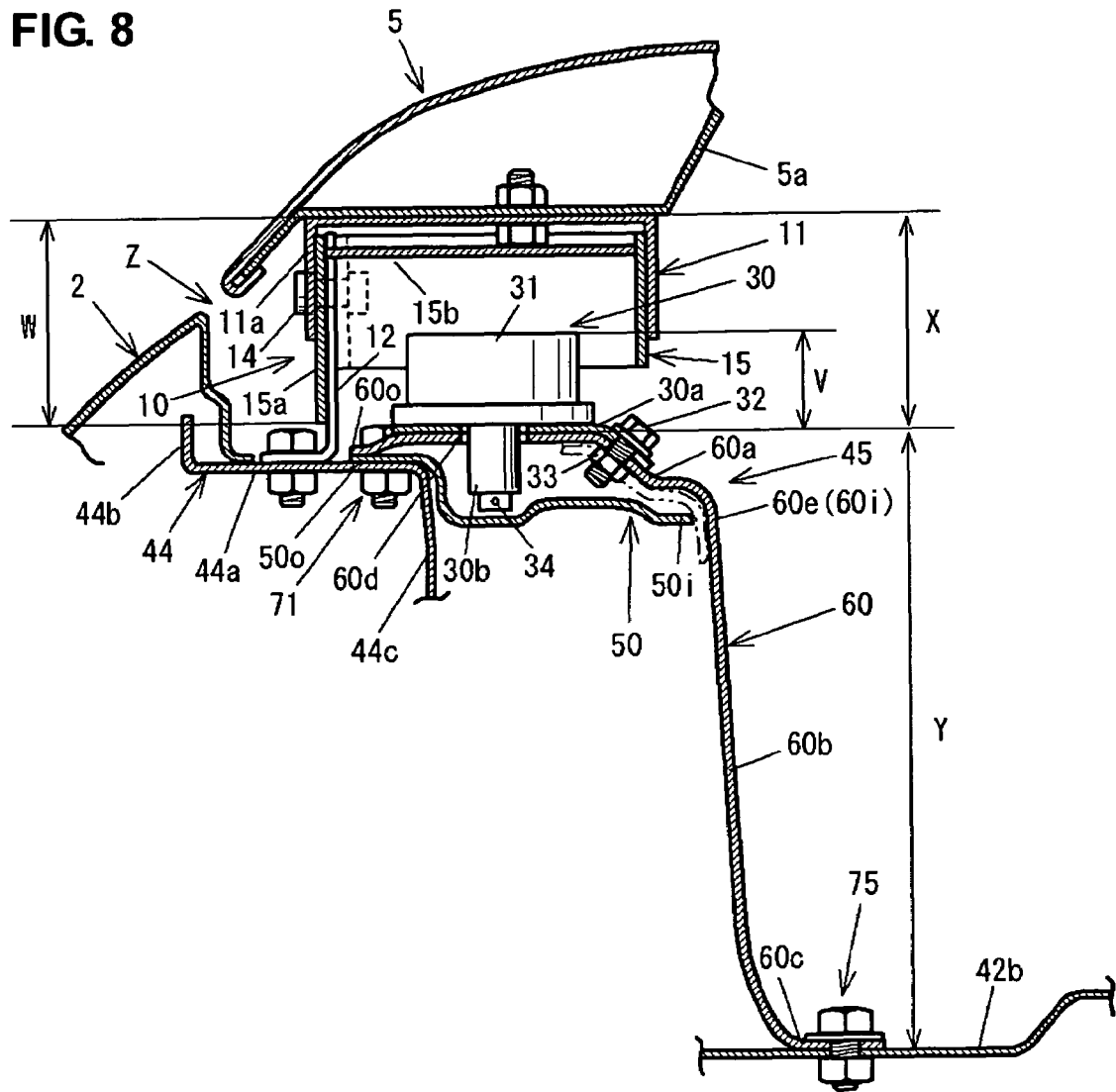
FIG. 8 is a sectional view taken along line B-B of FIG. 6.
Figure 9:
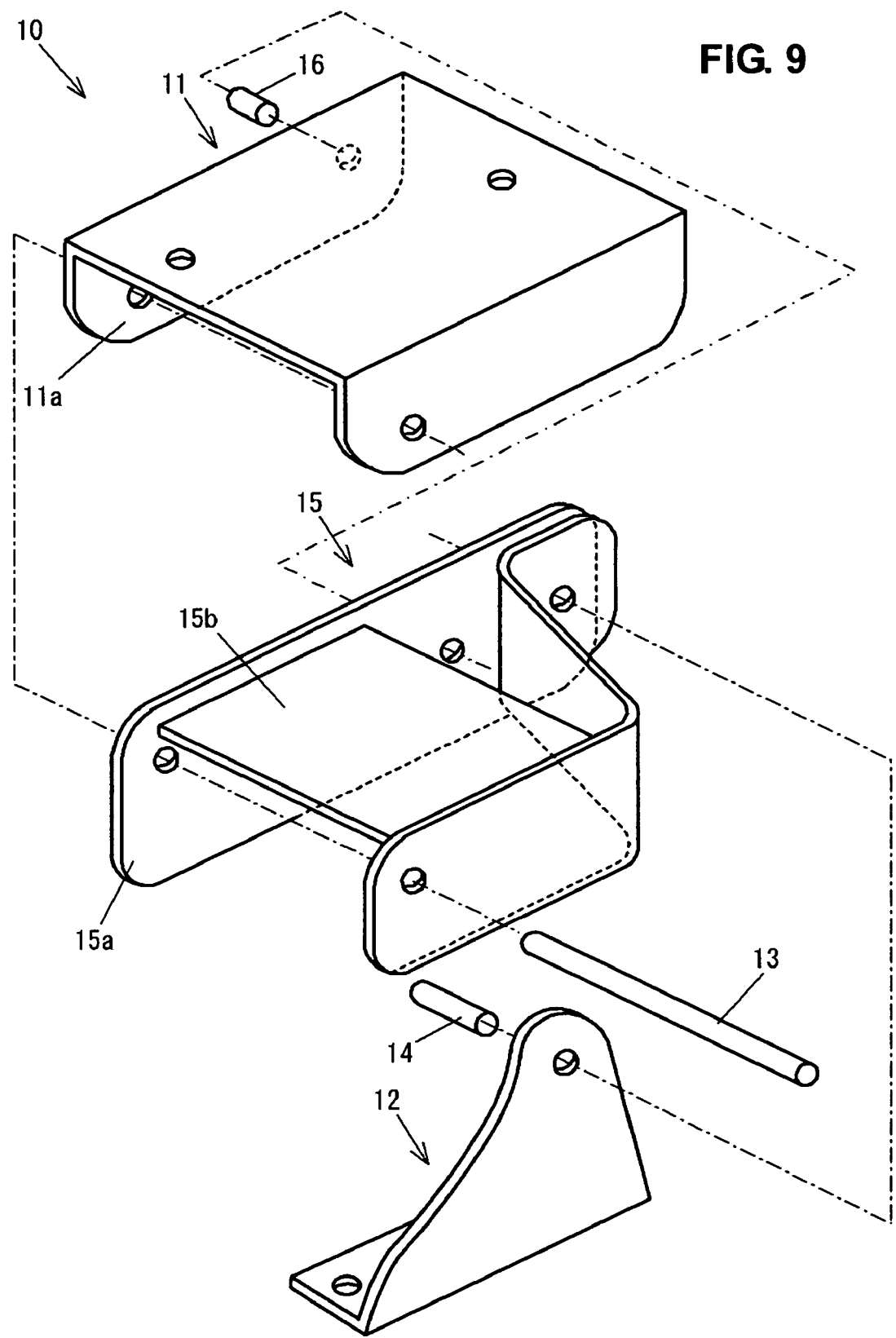
FIG. 9 is an exploded perspective view of a hinge mechanism.

A cowl plate upper 44 to form a front vehicle body with the fender 2 is provided at an attaching portion of the hinge mechanism 10 at the fender 2 as shown in FIGS. 5 and 6. The cowl plate upper 44 comprises, as shown in FIGS. 6 and 8, a flat face portion 44a to which the hinge mechanism 10 is attached, an outside vertical wall portion 44b extending upward from an outside end of the flat face portion 44a, and an inside vertical wall portion 44c extending downward from an inside end of the flat face portion 44a. Thereby, the attachment rigidity of the hinge mechanism 10 to the vehicle body is strengthened.

As shown in FIGS. 5-8, an attaching member 45 for the actuator 30 is provided crossing over the opening of the cowl portion 43. The attaching member 45 comprises a cowl reinforcement 50 extending over this opening and a bracket 60 attached to the cowl reinforcement 50.

Figure 7:
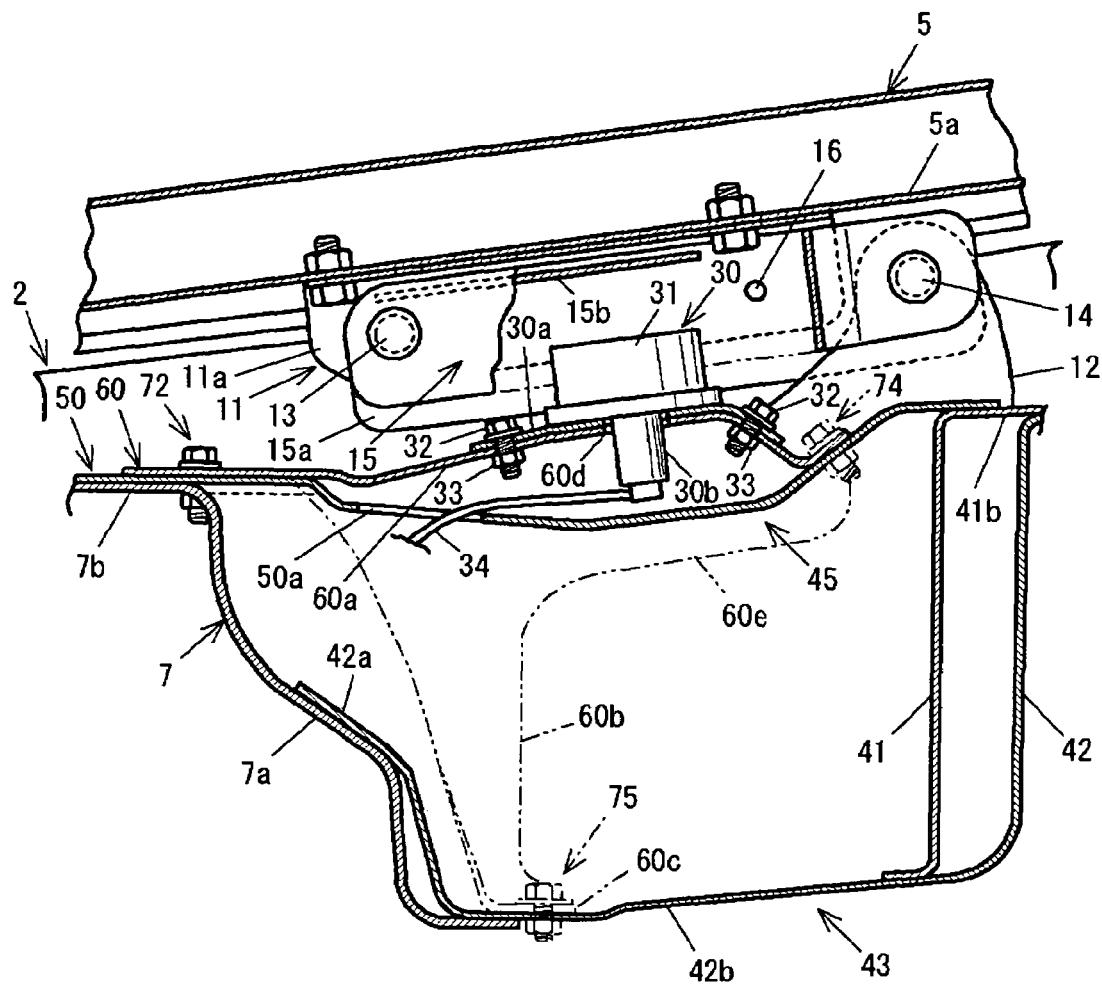
FIG. 7 is a sectional view taken along line A-A of FIG. 6.

The cowl reinforcement 50 is comprised of a plate member with a substantially L shape, when viewed from the above, as shown in FIGS. 5-7, and its front end is placed on an upper portion 7b of the suspension tower 7, its rear end is placed on an upper wall 41b of the cowl front panel 41, and its side end is placed on the cowl plate upper 44.

Meanwhile, the bracket 60 comprises, as shown in FIGS. 5-8, an attaching face portion 60a with a substantially horizontal face for the actuator 30, a flange 60e provided at an inside side end portion 60i of the attaching face portion 60a and extending downward, and a leg portion 60b extending further downward from the flange 60e. The bracket 60 is disposed on the cowl reinforcement 50. The attaching face portion 60a is disposed to be located in an upper position inside the fender 2, and placed on the cowl plate upper 44 via the cowl reinforcement 50. A front end of the attaching face portion 60a extends to the upper portion 7b of the suspension tower 7 and placed on the front end of the cowl reinforcement 50. The flange 60e is provided to be adjacent to and cover an inside side portion 50i of the cowl reinforcement 50 as shown in FIGS. 7 and 8.

The bracket 60 and cowl reinforcement 50 are fixed to plural attaching portions 71-75 of the vehicle body via bolts and nuts respectively as shown in FIGS. 5-8. Namely, at the attaching portion 71, a rear portion of an outside side end portion 60o of the bracket 60 is fixed to the cowl plate upper 44 with a rear portion of an outside side portion 50o of the cowl reinforcement 50. At the attaching portion 72, a front portion of the outside side end portion 60o of the bracket 60 is fixed to the upper portion 7b of the suspension tower 7 with a front portion of the outside side portion 50o of the cowl reinforcement 50. At the attaching portion 73, an inside portion of the front end of the bracket 60 is fixed to a center portion of the front end of the cowl reinforcement 50. At the attaching portion 74, the rear end portion of the bracket 60 is fixed to the rear end portion of the cowl reinforcement 50. At the attaching portion 75 (hereinafter, referred to as an inner end attaching portion 75), a seat portion 60c of the leg portion 60b that is formed below the attaching face portion 60a is fixed to a bottom wall 42b of the cowl rear panel 42.

Herein, a vertical distance X between the attaching face portion 60a of the bracket 60 and the inner panel 5a of the hood 5 is set to be shorter than a vertical distance Y between the attaching face portion 60a and the inner end attaching portion 75 as shown in FIG. 8.

Next, the attachment of the actuator 30 to the attaching face portion 60a of the bracket 60 will be described. The actuator 30 includes an attaching seat 30a having a shape corresponding to the attaching face portion 60a of the bracket 60 as shown in FIGS. 7 and 8. Bolt through holes are formed at these attaching face portion 60a and attaching seat 30a, and plural bolts 32 . . . 32 are inserted from above into these holes in a sate where the attaching seat 30a is just placed on the attaching face portion 60a. Then, nuts 33 . . . 33 are fastened to these bolts 32 . . . 32 from below, and thereby the seat 30a is fixed to the attaching face portion 60a. The nuts 33 . . . 33 are covered with the cowl reinforcement 50 from below.

Also, a through hole 60d is formed at the attaching face portion 60a of the bracket 60 where the actuator 30 is located, through which a connector portion 30b of the actuator 30 goes as shown in FIGS. 7 and 8. Further, a through hole 50a is formed at the cowl reinforcement 50 in a position before the actuator 30. A harness 34 to supply an electrical signal to the actuator 30 from the control unit 20 goes through this through hole 50a and leads to the connector portion 30b.

Next, the hinge mechanism 10 will be described. The hinge mechanism 10 comprises, as shown in FIGS. 6-9, a hood-side bracket 11 with a U-shaped cross section that is fixed to the inner panel 5a of the hood 5 via bolt and nut, a vehicle-body-side bracket 12 that is fixed to the flat face portion 44a of the cowl plate upper 44 via bolt and nut, a link body 15 whose front end is coupled to the front portion of the bracket 11 via a pin 13 and whose rear end is coupled to the upper portion of the bracket 12 via a support pin 14, and a lock pin 16 that is inserted between a rear portion of a vertical wall 11a of the bracket 11 and a rear portion of a vertical wall 15a of the link body 15 and is designed so as to be broken when a specified strong force is applied thereto.

Herein, as shown in FIGS. 7 and 8, these vertical walls 11a, 15a of the bracket 11, 15 forming the hinge mechanism 10 are located between the fender 2 and the actuator 30. And, these vertical walls 11a, 15a are located such that they are in an offset state vertically and middle portions thereof are overlapped when viewed laterally. A distance X between the lower end of the actuator 30 (the above-described attaching face portion 60a of the bracket 60) and the upper end of the hinge mechanism 10 (the lower face of the inner panel 5a of the hood 5), which is equal to the above-described distance X, is set to be shorter than a total distance of a distance V between the lower end and the upper end of the actuator 30 and a distance W between the lower end of the link body 15 (the lower end of the vertical wall 15a of the link body 15) and the upper end of the hinge mechanism 10 (the lower face of the inner panel 5a of the hood 5).

Also, the vertical walls 11a, 15a located between the fender 2 and the actuator 30 are provided longitudinally along the upper end portion of the fender 2 and the side end portion of the hood 5 as shown in FIGS. 6-8.

The attaching portions 71, 74 and 75 among the plural attaching portions 71-75 between the bracket 60 and the vehicle body are located inside the vertical walls 11a, 15a of the hinge mechanism 10.

Next, the function of the safety device of the vehicle 1 according to the present embodiment will be described.

According to the attachment structure of the actuator 30 and the like of the present embodiment, since the attaching member 45 for the actuator 30 is placed and fixed from above, crossing over the opening in the gutter shape, operations attaching or detaching the attaching member 45 can be done from above the cowl portion 43. Accordingly, the operation from inside the engine room 4 would not be necessary. Also, in the case where other components such as the wiper link are provided in the cowl portion 43, the above-described attachment or detachment can be done easily. Further, the rigidity of the cowl portion 43 can be strengthened.

Figure 10:
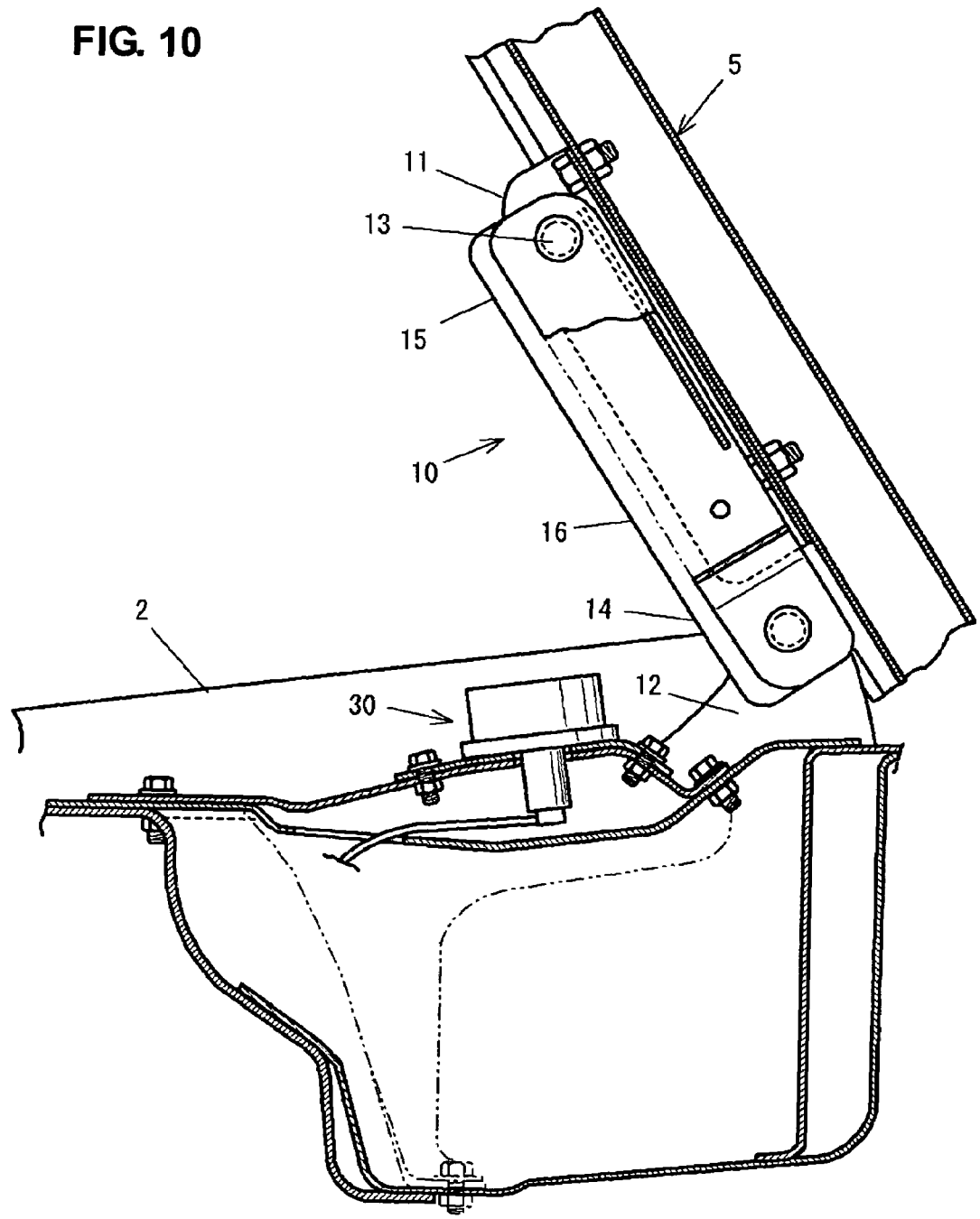
FIG. 10 is a view of a portion shown in FIG. 7 with the hood that is opened around its rear portion.

Next, the operation will be described. First, when an opening lever and the like (not illustrated) of the hood 5 that are provided in the vehicle or the like, a striker 8 provided at the hood 5 is disengaged with a lock mechanism 9 provided on a side of the engine room 4 as shown in FIG. 2. Then, when the front of the hood 5 is lifted up, the hood 5 is opened with a rotation around the pin 14 because the hood-side bracket 11 and the link body 15 of the hinge mechanism 10 are locked by the lock pin 16, as shown in FIG. 10.

Figure 11:
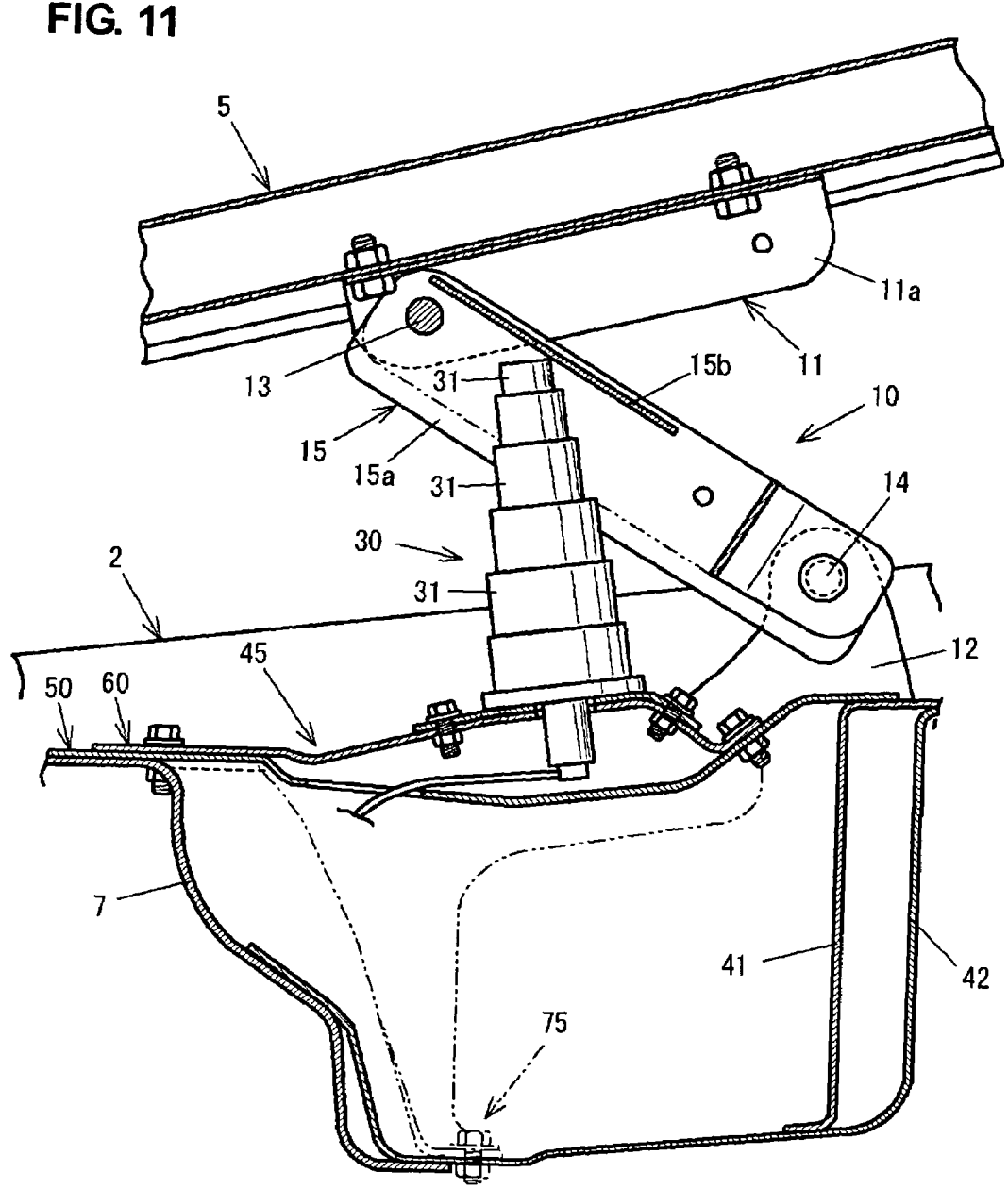
FIG. 11 is a view of the portion shown in FIG. 7 with the hood whose rear portion is lifted up relative to the vehicle body.

Herein, when the vehicle 1 hits against the pedestrian, the controller 20 detects the hitting based on the signal of the crash detecting sensor 21 and supplies the electrical signal to the ignition circuit of the actuator 30. Thereby, the explosives in the actuator 30 are ignited and produces gas. The cylindrical members 31 . . . 31 is pushed upward by pressure of the produced gas, and thereby the actuator 30 expands upward. Thus, the cylindrical member 31 at the top of the actuator 30 contacts and pushes a pressure receiving plate 15b of the link body 15 upward. Herein, the striker 8 of the hood 5 is originally engaged with the lock mechanism 9 and the hood 5 is prevented from being rotated around its rear portion during the vehicle traveling. However, after the top cylindrical member 31 has contacted the pressure receiving plate 15b the pressing force is applied to the lock pin 16. Then, when the pressing force becomes a large force enough to break the lock pin 16, the lock pin 16 is broken. As a sequence, as shown in FIG. 11, the cylindrical members 31 . . . 31 of the actuator 30 further extend and push up the pressure receiving plate 15b further. Thereby, the front of the link body 15 is rotated upward around the support pin 14, and the rear of the hood 5 is lifted up via the connecting pin 13 and the hood-side bracket 11. In this case, even if the pedestrian who has been hit by the vehicle is lifted up on and over the hood 5, the rear of the hood 5 is lifted up at the same time, so the pedestrian can be prevented from even indirectly hitting against the engine 3 or the like that are provided below the hood 5. Herein, although the front end of the hood 5 would be moved slightly backward by the lift up movement of the rear of the hood 5, this movement could be absorbed with a proper absorbing arrangement between the striker 8 and the lock mechanism 9.

Herein, the attaching member 45 is comprised of the cowl reinforcement 50 and the bracket 60 that form a double structure as shown in FIG. 11, the rigidity of this member 45 is increased and so improper downward bending of member 45 that may receive a reaction force from the actuator 30 can be suppressed.

Also, since the front end of the cowl reinforcement 50 is placed on the strong suspension tower 7, the reaction force from the actuator 30 can be transmitted to not only the cowl front panel 41 and the cowl rear panel 42 but to the suspension tower 7 with a high rigidity via the cowl reinforcement 50. Then, it can be transmitted to a vehicle tire and a road surface via the suspension tower 7. Further, since the rigidity of the suspension tower 7 comes to be increased further, an input load from the suspension can be supported properly and thereby the traveling stability of the vehicle 1 can be improved.

Further, since the front end of the bracket 60 is placed on the front end portion of the cowl reinforcement 50 provided on the suspension tower 7 in such a manner that both front ends overlap each other, the reaction force from the actuator 30 can be transmitted to the suspension tower 7 via the bracket 60 and then to the vehicle tire and the road surface via the suspension tower 7. Likewise, since the rigidity of the suspension tower 7 comes to be increased further, the input load from the suspension can be supported properly and thereby the traveling stability of the vehicle 1 can be improved.

Also, as shown in FIG. 8, since the hinge mechanism 10 is attached to the cowl plate upper 44 and this member 44 extends downward below the attaching member 45, the cowl plate upper 44 is biased downward via the attaching member 45 when the actuator 30 is operated. Accordingly, the hinge mechanism 10 can be properly prevented from being deformed and lifted up by the hood 5 whose rear portion is lifted up, so the rear portion of the hood 5 can be lifted up surely.

And, since at the inside side end portion 60*i* of the attaching face portion 60*a* is provided the flange 60*e* extending downward so as to be located near the inside side portion 50*i* of the cowl reinforcement 50, the rigidity of the bracket 60 is strengthened. Also, herein even if the inside portion of the bracket 60 was fallen downward and bent with a support point of the outside side end portion 60*o* by the reaction force caused by the operation of the actuator 30 as shown by a dotted broken line in FIG. 8, this could be prevented from being bent further by contacting the inside side portion 50*i* of the cowl reinforcement 50. Additionally, the distance X between the lower end of the actuator 30 (the attaching face portion 60*a* of the bracket 60) and the upper end of the hinge mechanism 10 (the lower face of the inner panel 5*a* of the hood 5), which is equal to the above-described distance X, is set to be shorter than the total distance of the distance V between the lower end and the upper end of the actuator 30 and the distance W between the lower end of the link body 15 (the lower end of the vertical wall 15*a* of the link body 15) and the upper end of the hinge mechanism 10 (the lower face of the inner panel 5*a* of the hood 5). Thereby, even in the case where the actuator 30 is disposed right below the hinge mechanism 10, the level of the hood 5 can be prevented from rising improperly, so both an appropriate vehicle styling and a proper pedestrian protection can be attained.

In addition, according to the present embodiment, proper functions of the anti-theft of the actuator 30 and the like can be provided. Hereinafter, these will be described.

As shown in FIG. 8, the attaching face portion 60*a* of the bracket 60 is disposed to be near the inside upper portion of the fender 2 and the inner end attaching portion 75 of the bracket 60 to the vehicle-body member, such as the cowl rear panel 42, is placed away from the fender 2. Accordingly, even if a tool was inserted into a gap Z between the upper end portion of the fender 2 and the side end portion of the hood 5 in order to detach the bracket 60 with the actuator 30 thereon, the tool would not reach the inner end attaching portion 75. Thus, the detaching of the bracket 60 and the actuator 30 is prevented, so the anti-theft and anti-tampering of the actuator 30 can be attained.

Also, since the attaching face portion 60*a* of the bracket 60 is provided substantially horizontally, it may become an obstacle against the tool coming in between the above-described gap Z, so the tool can be prevented more properly from reaching the inner end attaching portion 75.

And, the actuator 30 includes the attaching seat 30*a* to attach the actuator 30 to the attaching face portion 60*a* of the bracket 60, and the actuator 30 is fixed to the attaching face portion 60*a* with the nuts 33 . . . 33 fastened from below to the bolts 32 . . . 32 that are inserted from above into the bolt through holes formed at the attaching seat 30*a* and the attaching face portion 60*a*. Accordingly, any tool could not reach the nuts 33 . . . 33 located below the attaching face portion 60*a*, so it may become difficult to detach the actuator 30 itself from the bracket 60.

Further, since below the nuts 33 for fixing the actuator 30 is located the cowl reinforcement 50 as shown in FIGS. 7 and 8, an access to the nuts 33 from below is prevented by the cowl reinforcement 50. Accordingly, the actuator 30 can be prevented from being stolen further effectively.

Also, since the vertical distance X between the attaching face portion 60*a* of the bracket 60 and the inner panel 5*a* of the hood 5 is set to be shorter than the vertical distance Y between the attaching face portion 60*a* and the inner end attaching portion 75, the tools inserted into the gap between the fender 2 and the hood 5 may not reach the inner end attaching portion 75 and a maximum operational stroke of the actuator 30 can be obtained.

In the above-described embodiment, the vertical walls 11*a*, 15*a* of the hinge mechanism 10 correspond to at least part of the hinge device located between the fender and the lifting device defined in the claim. Also, these vertical walls 11*a*, 15*a* also correspond to a plurality of members that are located between the fender and the lifting device defined in the claim.

The present invention should not be limited to the above-described embodiments, and any other modification and improvements may be applied within the scope of a sprit of the present invention.

What is claimed is:

1. A safety device of a vehicle, which includes fenders located at both sides of the vehicle to form a front side of the vehicle and a hood covering an upper space between the fenders to form a front portion of the vehicle, comprising:
   a cowl portion provided at a vehicle body behind the hood, the cowl portion being formed in a gutter shape having an opening upward;
   a lifting device provided below the hood and operative to lift up a rear portion of the hood relative to the vehicle body; and
   an attaching member to attach said lifting device to the vehicle body thereby, the attaching member being placed on the vehicle body from above so as to be laid across said opening of the cowl portion longitudinally.

2. The safety device of a vehicle of claim 1, wherein said attaching member comprises an attaching face portion to which said lifting device is attached, which is disposed to be near an inside upper portion of the fender, and plural attaching portions to attach the attaching member to the vehicle body with bolts, an inner end attaching portion of the attaching portions being disposed below said attaching face portion.

3. The safety device of a vehicle of claim 2, wherein said attaching face portion is provided substantially horizontally.

4. The safety device of a vehicle of claim 3, wherein said lifting device includes an attaching seat to attach the lifting device to the attaching face portion of the attaching member, and the lifting device is fixed to the attaching face portion with a bolt and a nut, the bolt being inserted from above into bolt through holes which are formed at the attaching seat and the attaching face portion and the nut being fastened from the below to the bolt.

5. The safety device of a vehicle of claim 4, wherein below said nut is provided a plate member so as to cover the nut.

6. The safety device of a vehicle of claim 3, wherein a vertical distance between said attaching face portion and the hood is set to be shorter than a vertical distance between the attaching face portion and the inner end attaching portion.

7. The safety device of a vehicle of claim 2, wherein said inner end attaching portion is fixed to a bottom portion of the cowl portion.

8. The safety device of a vehicle of claim 1, wherein said attaching member is provided such that a front end portion thereof is placed on an upper portion of the suspension tower of a suspension, a rear end portion thereof is placed on an upper portion of a rear wall of the cowl portion, and a side end portion thereof is placed on a cowl plate upper to form the front side of the vehicle body with the fenders.

9. A safety device of a vehicle, which includes fenders located at both sides of the vehicle to form a front side of the vehicle and a hood covering an upper space between the fenders to form a front portion of the vehicle, comprising:
  a cowl portion provided at a vehicle body, the cowl portion being formed in a gutter shape having an opening upward;
  a lifting device provided below the hood and operative to lift up a rear portion of the hood relative to the vehicle body; and
  an attaching member to attach said lifting device to the vehicle body thereby, the attaching member being placed on the vehicle body from above so as to be laid across said opening of the cowl portion,
  wherein said attaching member comprises a reinforcement provided to be laid across the opening of the cowl portion and a bracket attached to the reinforcement, and one end of the reinforcement is placed on a suspension tower of a suspension.

10. The safety device of a vehicle of claim 9, wherein one end of said bracket is placed on the suspension tower in such a manner that the one end of the bracket and said one end of the reinforcement overlap each other.

11. The safety device of a vehicle of claim 10, wherein the hood is supported by a hinge device such that a front portion of the hood is openable and a rear portion of the hood is able to be lifted up relative to the vehicle body, the hinge device being disposed outside said lifting device, and there is provided a cowl plate upper to reinforce an attaching portion of the hinge device to the vehicle body, the cowl plate upper extending downward below said attaching member.

12. The safety device of a vehicle of claim 11, wherein an outside end portion of said bracket is placed on and fixed to said cowl plate upper, and at an inside end portion of the bracket is provided a flange extending downward in such a manner that the flange closely covers an inside end portion of the reinforcement.

13. A safety device of a vehicle, which includes fenders located at both sides of the vehicle to form a front side of the vehicle and a hood covering an upper space between the fenders to form a front portion of the vehicle, comprising:
  a cowl portion provided at a vehicle body, the cowl portion being formed in a gutter shape having an opemng upward;
  a lifting device provided below the hood and operative to lift up a rear portion of the hood relative to the vehicle body; and
  an attaching member to attach said lifting device to the vehicle body thereby, the attaching member being placed on the vehicle body from above so as to be laid across said opening of the cowt portion,
  wherein the hood is supported by a hinge device so as to be opened, and at least part of the hinge device is located between the fender and said lifting device.

14. A safety device of a vehicle of claim 13, wherein said part of the hinge device located between the fender and the lifting device comprises a plurality of vertical-wall members, and the plural vertical-wall members are located to be in an offset state vertically.

15. The safety device of a vehicle of claim 14, wherein said plural vertical-wall members of the hinge device located between the fender and the lifting device are disposed such that parts thereof overlap each other when viewed laterally.

16. The safety device of a vehicle of claim 14, wherein said plural vertical-wall members of the hinge device located between the fender and the lifting device are disposed longitudinally along an upper end portion of the fender or a side end portion of the hood.

17. The safety device of a vehicle of claim 13, wherein said attaching member comprises plural attaching portions to attach the attaching member to the vehicle body, and at least one of the plural attaching portions is disposed inside said part of the hinge device located between the fender and the lifting device.

18. The safety device of a vehicle of claim 17, wherein said attaching member comprises an attaching face portion to which said lifting device is attached, which is disposed to be near an inside upper portion of the fender, said lifting device includes an attaching seat to attach the lifting device to the attaching face portion of the attaching member, and the lifting device is fixed to the attaching face portion with a nut fastened from below to a bolt that is inserted from above into bolt through holes formed at the attaching scat and the attaching face portion.

19. A safety device of a vehicle, which includes fenders located at both sides of the vehicle to form a front side of the vehicle and a hood covering an upper space between the fenders to form a front portion of the vehicle, comprising:
  a lifting device provided below the hood and operative to lift up a rear portion of the hood relative to a vehicle body;
  an attaching member to attach said lifting device to the vehicle body thereby, the attaching member being provided below a side end portion of the hood; and
  a hinge device to support the hood, at least part of the hinge device being located between the fender and said lifting device.

* * * * *